Oct. 10, 1950 — G. W. WALTON — 2,525,248
UNITARY CRANK AND ECCENTRIC SHAFT
Filed July 20, 1945 — 3 Sheets-Sheet 1
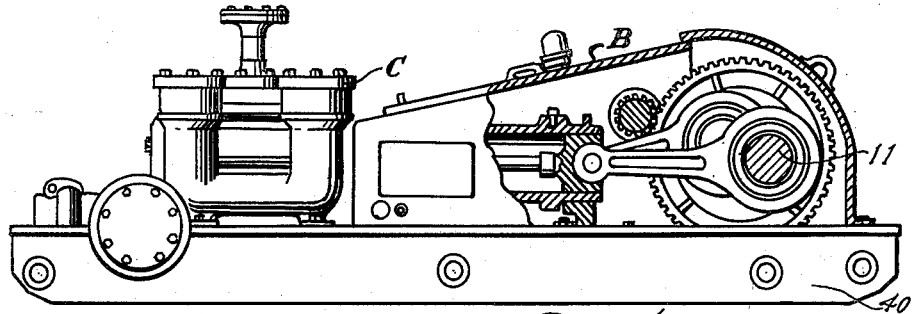
Fig. 1
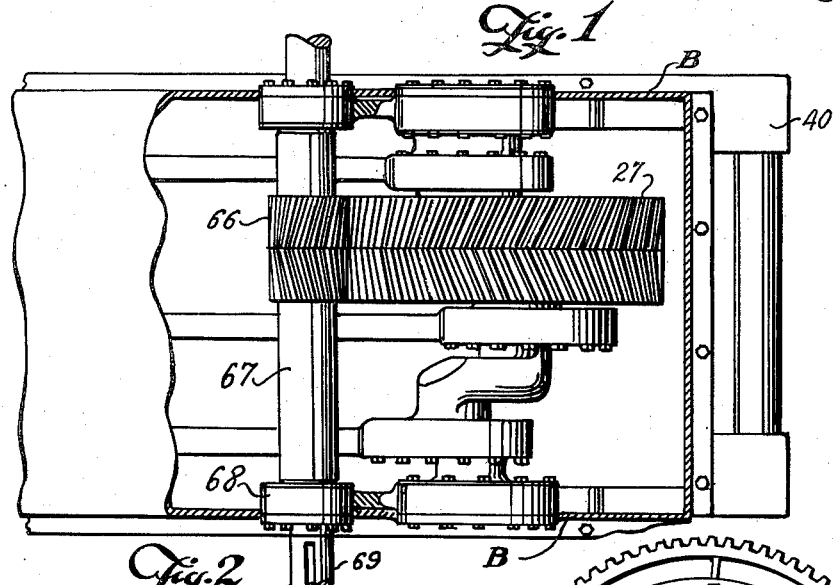
Fig. 2
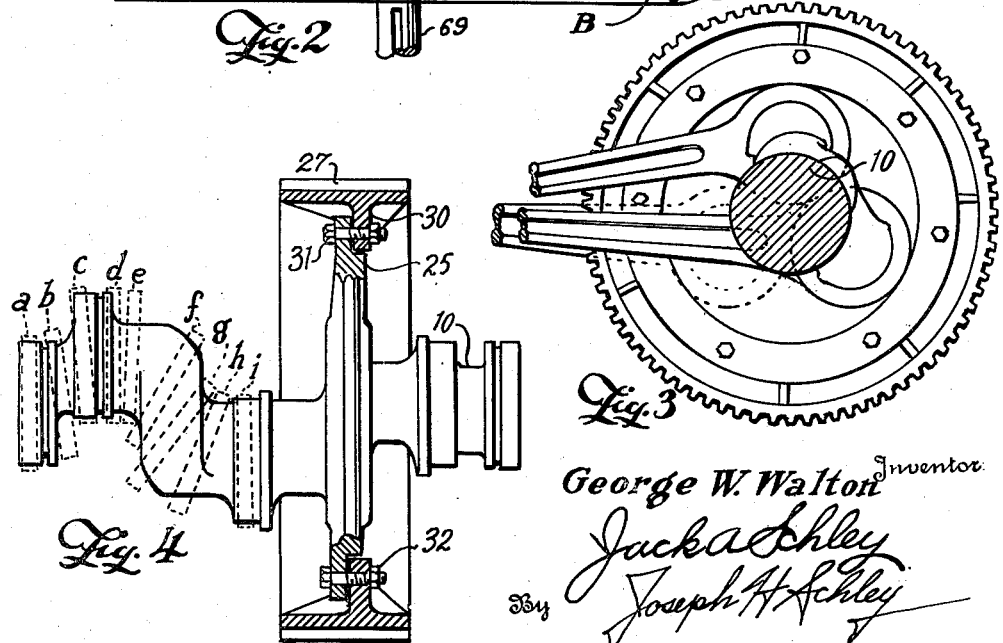
Fig. 3
Fig. 4
George W. Walton, Inventor
By Jack Achley
Joseph H. Achley
Attorneys

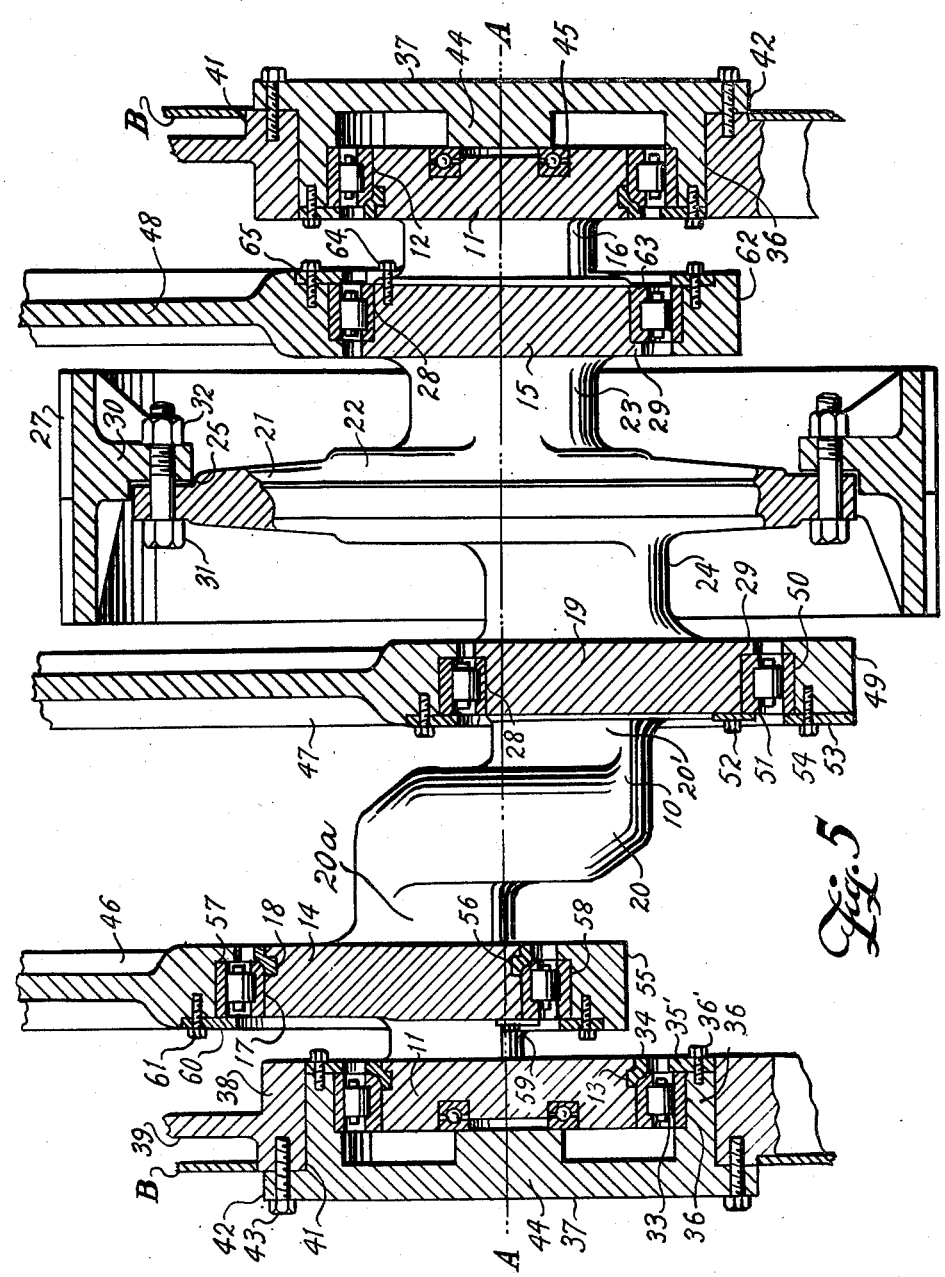

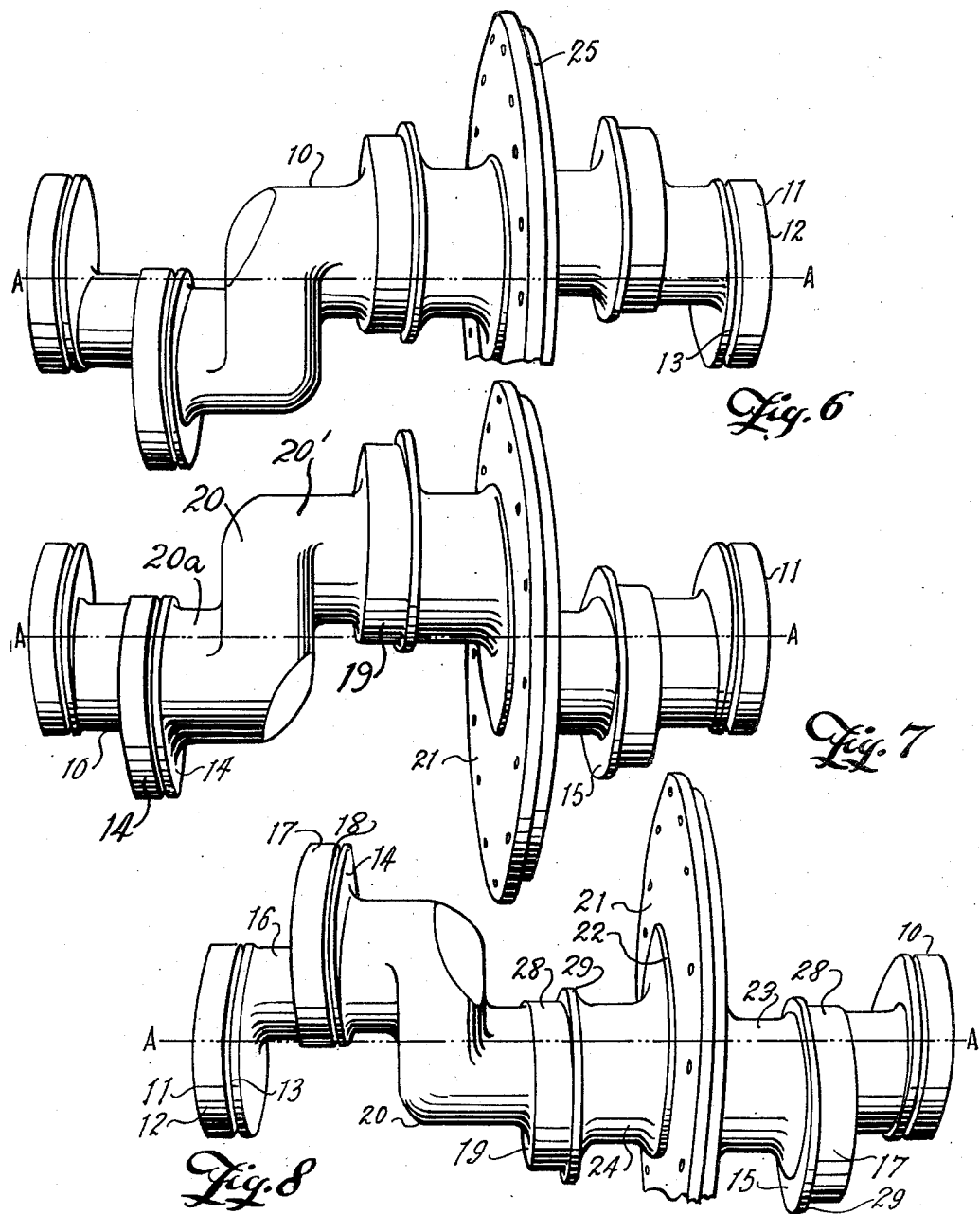

Patented Oct. 10, 1950

2,525,248

UNITED STATES PATENT OFFICE 2,525,248

UNITARY CRANK AND ECCENTRIC SHAFT

George W. Walton, Tulsa, Okla.

Application July 20, 1945, Serial No. 606,123

2 Claims. (Cl. 74—596)

This invention relates to new and useful improvements in unitary crank and eccentric shafts.

One object of the invention is to provide an improved crank and eccentric shaft wherein the various elements are integral, thus permitting the shaft, together with its eccentrics or throws, to be formed in one piece, which makes for sturdiness and simplicity.

A further object of the invention is to provide a one-piece shaft adapted to be mounted at its ends in main bearings and having a crank and eccentric throws intermediate its end bearings, whereby intermediate bearing supports are eliminated and tendency of the shaft to get out of longitudinal alinement or undergo lateral displacement relative of a point intermediate its ends is reduced to a minimum.

Still a further object of the invention is to provide a one-piece shaft having a crank and eccentric throws intermediate its ends arranged so that continuous connecting rod collars and continuous retaining and bearing rings, as well as split or sectional rings, may be mounted thereon by passing the continuous collars and rings over intermediate elements of the shaft.

Another object of the invention is to provide a one-piece crank and eccentric shank arranged in a new and novel manner, whereby bearing rings of relatively small diameter may be used.

Still another object of this invention is to provide an improved shaft of the character described having simple and adequate retaining means for the bearing rings and the connecting rod collars, which may be readily installed.

A still further object of the invention is to provide an improved crank and eccentric shaft having an integral hub and gear web disposed concentrically with the end bearing members, whereby the shaft may be gear-driven from a point intermediate to its ends.

An important object of the invention is to provide a one-piece crank shaft wherein the main bearing members and the gear hub are concentric to the longitudinal axis of the shaft with a short crank having opposite lateral extensions close to the axis whereby the shaft and crank are made stout and rigid, together with annular throws mounted eccentrically on the lateral extensions, throws being close to the axis and permitting the use of connecting rods collars of reduced diameters.

A construction designed to carry out the invention will be hereinafter described together with other features of the invention.

The invention will be more readily understood from a reading of the following specification and by reference to the accompanying drawings, wherein an example of the invention is shown, and wherein:

Fig. 1 is a side view, partly in elevation and partly in section, of a slush pump having a shaft constructed in accordance with the invention, Fig. 2 is an enlarged view, partly in plan and partly in cross section, of the shaft and component parts, Fig. 3 is a side elevation of the shaft and component parts, Fig. 4 is a view, partly in longitudinal elevation and partly in section, illustrating by dotted lines the method of placing and/or removing one of the collars or continuous rings, Fig. 5 is an enlarged distorted view, partly in elevation and partly in section, with the end bearing members, the throws and the hub and web brought into a common vertical plane for the purposes of illustration only, and Figs. 6, 7, and 8 are perspective views of the shaft in various positions with respect to its orbit of revolution.

In the drawings, the numeral 10 designates generally, a crank and eccentric shaft, the longitudinal axis of which is indicated by a broken line A—A in Figs. 5 to 8 inclusive. At each end the shaft is formed with annular bearing members or disks 11 having cylindrical faces 12. Each disk has an annular groove or recess 13 in its face adjacent and contiguous to its inner edge.

Spaced inwardly from each disk, annular eccentrics or throws 14 and 15, respectively, are connected with the disks by shanks 16. The throw 14 has a cylindrical face 17 and is provided with an annular recess or groove 18, adjacent and contiguous to its inner edge and is connected with a throw 19 by a crank 20. Between the throws 15 and 19, a circular gear web 21 concentrically surrounds and is made integral with a hub 22, which in turn is formed integral with shanks 23 and 24, respectively, on each side thereof. These shanks connect with the throws 14, 15 and 19. The web has an annular recess 25 at its marginal edge. The disks 11 and the hub 22 are disposed concentrically of the axis A—A. Each of the throws 14, 15 and 19 is provided with a cylindrical face 28. At its inner margin, each of these faces is provided with an annular flange 29.

When the disks 11 are mounted to revolve in suitable bearing supports, the revolution of the hub and web will be concentric to the axis A—A and a gear ring 27 secured around the said web may be employed to revolve the shaft. This gear ring may be of the herringbone type, as is shown in Fig. 2. The gear ring 27 is provided with an internal laterally offset flange 30 which fits in the recess 25 and is fastened by bolts 31 and nuts 32. From the foregoing, it will be seen that all of the elements with the exception of the gear ring and its fastenings, may be formed in one piece, the many advantages of which will appear from the description hereinafter given.

The throws and their connecting elements may be disposed at various radial angles with respect to the axis A—A and the concentric web 21. As is shown in Fig. 3, the three throws 14, 15 and 19 may be equally spaced at 120° and thus, the shanks 16, the crank 20 and the shanks 23 and 24 will be connected to the throws, the disks 11 and the web 21 in the offset relation shown in the drawings so as to produce such desired spacing.

I have shown the shaft 10 mounted in the housing B of a slush pump C. As is shown in Fig. 5, the faces 12 of the disks 11 are fitted with ordinary straight roller-bearing rings 33. In the interest of a simplified description the bearing assemblies will be referred to as bearing rings, such rings being composed of inner and outer races with either balls or rollers therebetween and being purchasable in the open market. These rings are not as wide as the faces of the disks 11 and their annular margins are seated in recessed and shouldered, split retaining rings 34, which are engaged in the grooves 13 and over by the inner marginal portions of the faces 12. These retaining rings 34 prevent inward displacement or thrust of the bearing rings and are resilient so as to remain in the grooves, but being readily removable therefrom when the bearing rings are removed.

Each of the bearing rings 33 is fitted in an internal seat 35 formed in the annular flange 36 of a circular cap 37. The caps 37 are snugly fitted in bearing collars 38 formed integral with a pump frame 39. Flat retaining rings 35' are secured to the inner ends of the flanges by machine screws 36'. The rings 35' are passed over the disks before the adjacent throws and their rings are mounted. The pump frame is fastened on skids 40. The sides of the housing B cover the sides of the pump frame and have circular openings 41 through which the flanges 36 extend. The caps 37 are provided with outwardly directed annular flanges 42 which receive machine bolts 43, screwed through the housing sides into the collars 38, whereby the caps are secured in place and the housing sides are confined. For taking the end thrust of the shaft 10, each cap has a central, inwardly extending boss 44, bearing against a ball-bearing ring 45 seated in the end of the adjacent disk 11.

The shaft 10 being provided with three throws is adapted to drive the pistons of three pump cylinders, such pumps being in common use, their structures will not be shown and described. The throws 14, 19 and 15, operate connecting rods 46, 47 and 48, respectively and these rods are connected with the pistons in any suitable manner. As before pointed out, one object of the invention is to provide a one-piece shaft, whereby the various rings and connections, either split or integral may be conveniently placed thereon, thus doing away with numerous bolted joints.

The connecting rod 47 has a continuous unbroken throw head or collar 49 at its outer end. This collar is provided with an annular internal seat 50 complementary to the face 28 of the throw 19. A roller bearing ring 51 is slipped onto the face 28 and held against the flange 29 (Fig. 5) by flanged machine bolts 52, screwed into the margin of the throw collar so as to overhang the ring. A flat retaining ring 53 is counter-sunk in the outer side of the throw ring 49 and secured by machine bolts 54 so as to overhang the bearing ring 51.

It is pointed out that the relative external diameters of the disk 11 (left hand Fig. 5) and the throw 14 of the shaft and the internal diameters of the throw collar 49, bearing ring 51 and retaining ring 53, are such as to permit the threading or telescoping of the rings and the collar, longitudinally of the shaft, as indicated generally by dotted lines in Fig. 4, successive positions designated by the letters $a$ to $i$, inclusive. The crank 20 is so formed and proportioned as to permit the passage of the elements 49, 51 and 53, as indicated by the positions $e$ to $h$, inclusive. This structure makes it possible to form the elements 49, 51 and 53 with continuous unbroken annuli and avoids splitting or bolting the annulus together. The parts may be removed in a reverse order. The rings and collar are, of course, mounted on the shaft before the bearing rings 33 and the retaining rings 34 are placed on the disks 11.

After the throw ring 49 of the connecting rod 47 has been installed, the connecting rod 46 may be connected to the shaft. A split retaining ring 56 similar to the ring 34 is passed over the disk 11 adjacent the throw 14. This ring is split so that it may be passed over the face 17 of said throw and engaged in the groove 18. The rod 46 has a throw collar 55 and this collar is passed over the disk 11 so as to surround the throw 14. A roller bearing ring 57 is next threaded over the said disk 11 and snugly fitted on the face 17 against the retaining ring 56 and into an internal annular seat 58 in the collar 55. This bearing ring is fastened like the ring 51, by flanged bolts 59 and an unbroken retaining ring 60 secured to the collar by machine bolts 61, which is likewise passed over the disk 11.

The mounting of the connecting rod 48 is quite similar to the mounting of the rod 47. The rod 48 has a throw collar 62, which is continuous and unbroken like the collars 49 and 55. A roller bearing ring 63 is fitted over the face 28 of throw 15 against the flange 29 and held in place by flanged bolts 64 and a continuous retaining ring 65. The gear ring 27 may be installed either before the throw collars 49 and 55 are mounted or before the throw collar 62 is mounted.

From the foregoing description it will be seen that the only split elements placed on the shaft 10 are the split rings 34 and 56. These rings could be sectional instead of merely split. All of the remaining mountings are continuous and unbroken. The disks 11 and their mountings constitute the main bearing supports and while they are eccentric to all other integral elements of the shaft, with the exception of the hub 22 and web 21, they are alined co-axially with the axis A—A. The hub and web are also co-axially alined with said axis. It is obvious that so long as the throws 14, 15 and 19 are kept small enough in diameter, their annular disposition and spacing is subject to wide variation.

The gear ring 27 may be driven in any suitable manner. In Figs. 1 and 2 I have shown a complementary pinion 66 meshing with the gear ring for driving the same. This pinion is mounted on a transverse drive shaft 67 journaled in bearing members 68 carried by the frame 39. This shaft may extend from both or either sides of the housing and has reduced ends 69, on either of which a driving pulley or gear (not shown) may be mounted.

It is pointed out that the crank 20 is provided with laterally extending portions 20a and 20'; the extension 20a being connected to the throw 14 eccentrically and the extension 20' being connected to the throw 19 eccentrically. By this arrangement a short crank and a very rigid and stout structure are provided. The extensions are close to the longitudinal axis of the shaft. The longitudinal axis passes through the throw 15 as well as the shaft portions on each side thereof and this adds to the rigidity of the shaft. The structure which has been described permits the use of connecting rod collars which are considerably less in diameter than those commonly used; also the overall length of the shaft is shortened.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A one-piece crank shaft including, a medial hub disposed concentrically of the shaft, shanks extending from opposite sides of the hub eccentrically thereof, circular throws integral with the outer ends of the shanks, an end bearing disk spaced from and integrally connected with one of the throws, a crank having its inner end integral with the other throw, a third throw integral with the outer end of the crank, a second end bearing disk integrally connected to and spaced from the third throw, and the end disks being concentric of the longitudinal axis of the shaft, the end disks and the third throw being of such diameters that complete bearing ring assemblies may be passed thereover longitudinally of the shaft for mounting on the throws on each side of the hub.

2. A one-piece crank shaft as set forth in claim 1, wherein the inner throws on each of the hubs have annular bearing retaining flanges, and the third throw and disks have annular faces free from projections.

GEORGE W. WALTON.

REFERENCES CITED

The following references are of record in the file of this patent:

UNITED STATES PATENTS

| Number | Name | Date |
|---|---|---|
| 1,210,996 | Slate | Jan. 2, 1917 |
| 1,723,299 | Picard | Aug. 6, 1929 |
| 1,773,301 | Canfield | Aug. 19, 1930 |
| 1,813,153 | Farmer | July 7, 1931 |
| 1,899,189 | Fink | Feb. 28, 1933 |
| 2,038,747 | Magnuson | Apr. 28, 1936 |
| 2,249,802 | Wilson | July 22, 1941 |
| 2,336,272 | Magnuson | Dec. 7, 1943 |
| 2,434,659 | Kluppel | Jan. 20, 1948 |